United States Patent [19]

Doi et al.

[11] Patent Number: 4,589,723
[45] Date of Patent: May 20, 1986

[54] HOLOGRAPHIC ENDOSCOPE

[75] Inventors: Yoshikazu Doi; Masane Suzuki; Yasumasa Sunaga, all of Saitama, Japan

[73] Assignee: Fuji Photo Optical Co., Ltd., Saitama, Japan

[21] Appl. No.: 603,960

[22] Filed: Apr. 24, 1984

[30] Foreign Application Priority Data

Apr. 30, 1983 [JP] Japan .................. 58-77239

[51] Int. Cl.$^4$ .................. G02B 23/26; G03H 1/04; A61B 1/06
[52] U.S. Cl. .................. 350/3.83; 350/96.26; 128/6
[58] Field of Search ........... 128/4, 6; 350/96.25, 350/96.26, 3.83, 3.84, 3.85, 3.86, 3.6, 572, 573, 502

[56] References Cited

U.S. PATENT DOCUMENTS 4,036,218 7/1977 Yamashita et al. ............. 128/4
4,425,025 1/1984 Sunaga ..................... 350/96.26
4,501,477 2/1985 Sunaga ..................... 350/572

FOREIGN PATENT DOCUMENTS 57-190985 11/1982 Japan .

OTHER PUBLICATIONS

"The Wonder of Holography", National Geographic, vol. 165, No. 3, Mar. 1984, pp. 370–372.

Primary Examiner—John K. Corbin
Assistant Examiner—Bruce Shapiro
Attorney, Agent, or Firm—Young & Thompson

[57] ABSTRACT

A holographic endoscope transmits light to an object and receives and transmits the image of that object. The light transmitted is used to illuminate an object with one of two beams which are derived from a single laser, while the image received is transmitted from the object. The light from the image transmitted passes through a field lens, and a second beam or reference beam is made to interfere with this light. The resulting interference pattern is recorded on a photographic plate, forming the hologram.

4 Claims, 4 Drawing Figures

HOLOGRAPHIC ENDOSCOPE

BACKGROUND OF THE INVENTION

The present invention relates to a holographic endoscope used for recording a hologram, and more particularly to a holographic endoscope wherein a field lens is disposed in front of a photographic plate on which an interference pattern is recorded.

As is now widely known, holographic techniques are employed for examinations or measurements of physical phenomena, such as the state of deformation of the surface of an object. There has been proposed a holographic endoscope which is used for recording the interference pattern of wave fronts of light from an object, such as a portion which is otherwise invisible, for example the inside of an engine or other apparatus, the cavity of a human body such as the stomach or intestine, or the like. The recorded information, i.e. a hologram, is then used to reconstruct an image of the subject for visible inspection. Otherwise, the reconstructed image may be recorded as an ordinal photograph for examinations or measurements.

A holographic endoscope which is well known is shown in FIG. 1, by way of example. In this holographic endoscope, two beams are directed from a single laser 1, such as an argon laser, by means of a beam splitter 2. One beam which is referred to as the illumination beam is reflected by a mirror M1 and used to illuminate an object $I_o$. The illumination beam is guided through a light transmitter 3 or optical fiber bundle (which may be a means comprising a combination of lenses) which withdrawably extends through an insertable section of an endoscope and is extended therefrom to illuminate the object Io to be examined. The light reflected from the object $I_o$ (which is referred to as an "object light") bears an image of the object which is formed by an objective lens 4 on an end surface of an image-transmitter 5 or image-transmitting optical fiber bundle and then transmitted to the opposite end surface 5a thereof. The other beam is reflected by mirrors M2 and M3 and used as a reference beam. The reference beam and the object light are then allowed to interfere with each other, and the resulting interference pattern is recorded on a photographic plate 7, forming the hologram 9. A divergent lens 6 broadens the reference beam without affecting its coherence.

The hologram 9 thus formed and then developed by the process of ordinary photographic technique is illuminated by the reference beam alone, reproducing the same wave fronts as reflected from the original object. The reproduced wave fronts appear to emanate from an image $I_H$ of the subject. This image $I_H$ can then be viewed with the eye 11 or other optical instruments or recorded with a camera. For shielding the illumination beam upon illuminating the hologram 9 with the reference beam, there is provided a shutter 10 as shown in FIG. 1. It should be noted that the holographic endoscope is available as a conventional one in case the photographic plate 7 is removed, while guiding the illumination light emitted from a halogen or xenon lamp through the light transmitting optical fiber bundle 3. In this case, a virtual image of the image I1 formed by the lens 8 can be observed either visually or with a camera.

Such a holographic endoscope as described above, however, has a problem to be solved, that is, it becomes difficult to provide enough space for directing the reference beam to the photographic plate 7 with decreasing distance between the lens 8 and photographic plate 7. On the contrary, upon providing enough space therebetween, the object beam is broadened on the photographic plate with a result of a lowering of density of light energy per unit area, resulting in a prolonged exposure time for recording the interference pattern. The photographic plate under a long time exposure is very susceptible to vibrations, fluctuations of air and the like, so that the contrast of interference pattern recorded becomes low, resulting in a blur and indiscernible reconstructed image.

In addition, there is caused in the aforementioned holographic endoscope another problem, namely that what one can visually observe from point is only a part of the whole reconstructed image IH, and in order to observe the whole reconstructed image IH, it is necessary to move the eye 11 back and forth, and right and left, since the object beam is broadened through the lens 8 and the distance D2 between the lens 8 and the eye 11 is long.

In view of the actual circumstances, such a holographic endoscope as is shown in FIG. 2 has been proposed. In FIG. 2, wherein the same numerals and symbols denote similar parts to those in FIG. 1, the image I1 transmitted to the end of the image-transmitting optical fiber bundle 5 is magnified by the lens 8 to form an image I2. A photographic plate 20 on which an interference pattern is recorded should be disposed between the lens 8 and the magnified image I2.

The holographic endoscope thus constructed is able to provide a high density of light energy per unit area by adjusting the axial position of the photographic plate 20. As a result of this, a high contrast and bright reconstructed image is obtained.

In this case, however, it becomes difficult to direct the reference beam broadened through the lens 6 to the photographic plate 20 because the photographic plate 20 is brought close to the lens 8 for providing a high density of light energy. Additionally, the reconstructed image I2, which is visible therebehind, is only partially observable and when it is necessary to observe the whole, an optical system 21 for observation is indispensable.

SUMMARY OF THE INVENTION

It is therefore a primary object of the present invention to provide a holographic endoscope which can keep the energy of object beam at a high density so as to form a satisfactory hologram.

It is another object of the present invention to provide a holographic endoscope in which a photographic plate is exposed for a short time so that it is less subject to vibration, the fluctuations of air and the like.

It is yet another object of the present invention to provide a holographic endoscope in which a space allowing a reference beam to travel and reach a photographic plate can be easily ensured.

It is further object of the present invention to provide a holographic endoscope which can make it possible to observe a whole reconstructed image at a time without changing the position and the posture of the observer.

In order to achieve these objects, there is provided in a photographic endoscope a field lens between an image-transmitting fiber bundle and a photographic plate on which an interference pattern of reference beam and object beam is recorded. The field lens, which has its principal point coincident with an image in position, functions to increase the density of energy of an object beam as moved away from the photographic plate due to its convergent effect. The object beam with the increased density of energy permits shortening the exposure time of the photographic plate. As the photographic plate exposed for a short time is less subject to vibration, the fluctuations of air and the like, it becomes possible to form the hologram recording exactly all the information contained in a wave front, resulting in images reconstructed by means of hologram that are extremely realistic.

Other and further objects, features and advantages of the present invention will be apparent from the following description taken in conjunction with the accompanying drawings.

DETAILED DESCRIPTION OF THE INVENTION

Figure 1:
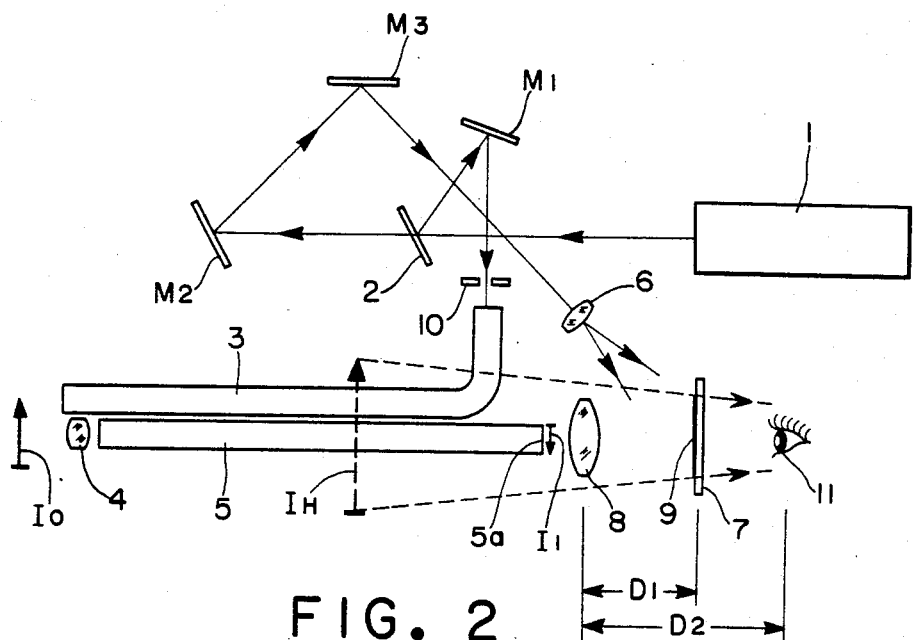
FIG. 1 is a schematic diagram of a conventional holographic endoscope.
Figure 2:
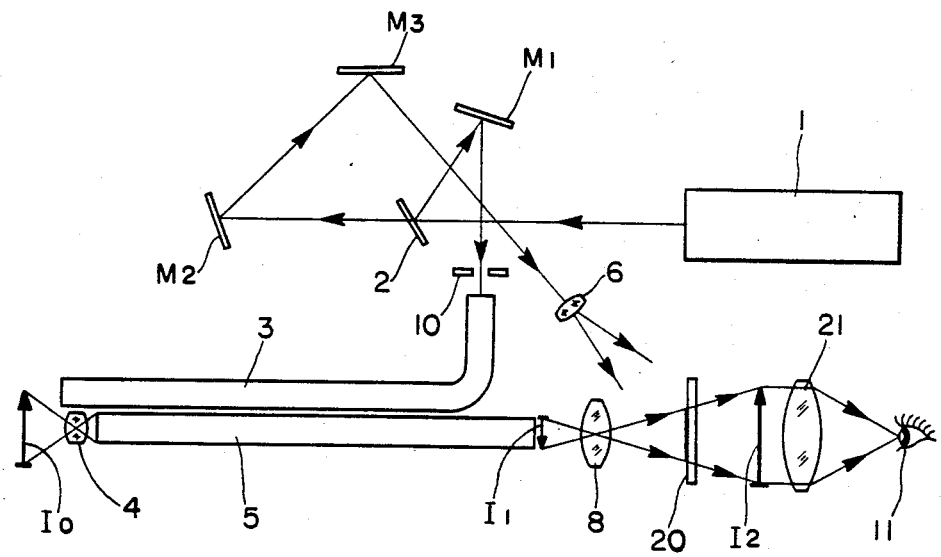
FIG. 2 is a schematic diagram illustrating a known modification of FIG. 1.

Before proceeding with the description of the embodiment of the invention, it will expressly be understood that like reference symbols are used to designate like components of the holographic endoscopes shown in FIGS. 1 and 2 for simplicity of illustration.

Figure 3:
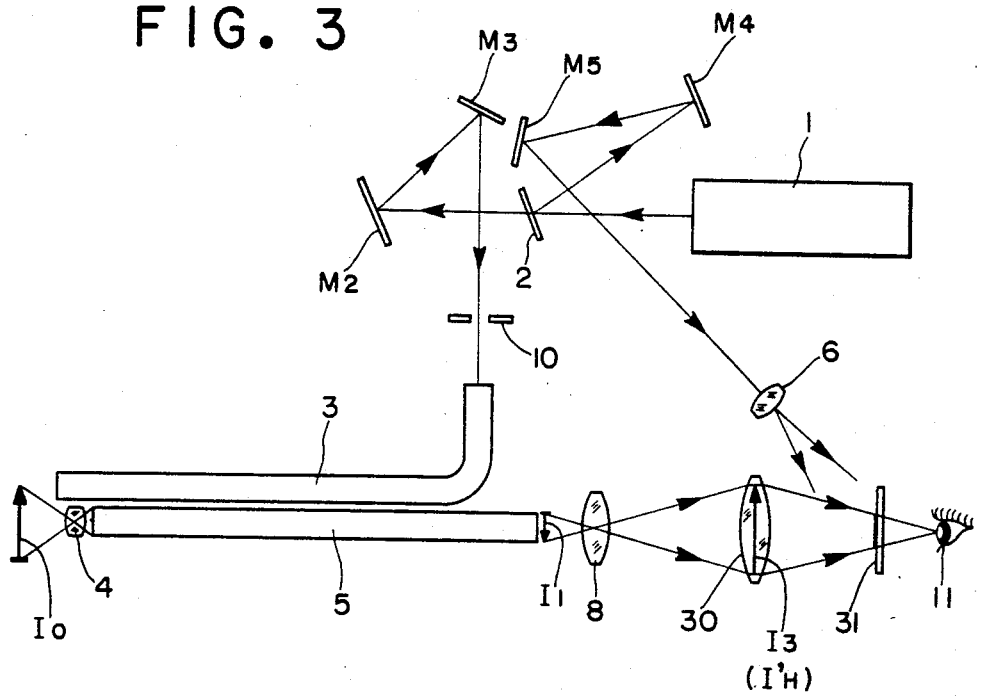
FIG. 3 is a schematic diagram of a holographic endoscope of an embodiment of the present invention.

Referring now to FIG. 3 showing a holographic endoscope of an embodiment according to the present invention, there is shown a holographic endoscope, which is provided with a field lens 30 behind the lens 8. At the side opposite to the lens 8, there is provided a photographic plate 31 on which an interference pattern is to be recorded.

At the principal point of the field lens 30, there is formed a magnified image I3 of the image I1. The magnification will be effected by moving either the exit end of the image-transmitting fiber bundle 5 or the lens 8 along the optical axis in the same manner as mentioned with regard to the holographic endoscope shown in FIG. 2. Mirrors M4 and M5 which are aimed to make the optical path length of the reference beam equal to that of the illumination beam reflect a part of the beam derived from a single laser beam split by means of the beam splitter 2, such as a half-silvered mirror and then direct the beam toward the divergent lens 6 for broadening and illuminating the photographic plate 31.

The holographic endoscope thus constructed permits easily attaining a density increase of light energy per unit area by moving the photographic plate 31 away from the field lens 30 along the optical axis. Accordingly, it is adapted to shorten the exposure time for recording an interference pattern on the photographic plate 31 and forming the hologram. This construction makes it possible to form the hologram while avoiding the effect of vibrations, fluctuations of air and the like thereon. Furthermore, that the photographic plate 31 may be disposed with a sufficient space behind the field lens 30 makes it easy not only to direct the reference beam to the photographic plate but also to make small sized photographic plates available.

The holographic endoscope according to the invention provides a reconstructed image which is visually observed from the rear of the field lens 30. In this case, it is desirable to place the eyes 11 at the distance of distinct vision, i.e., about 250 mm behind the field lens 30, for visual observation with less fatique.

Figure 4:
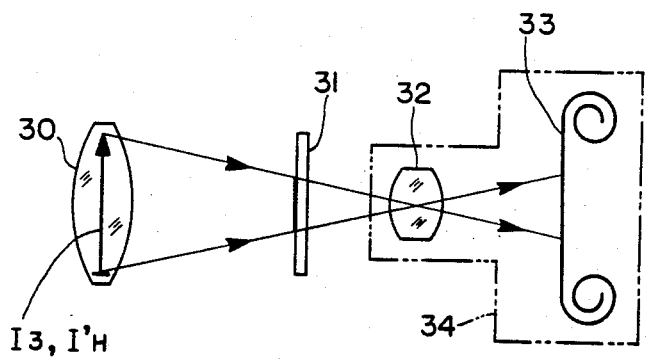
FIG. 4 is a schematic diagram of a photographing device which is used for taking a picture of a reconstructed image.

For recording either the image I3 at the principal point of the field lens 30 or the reconstructed image IH from the hologram, there is, as shown in FIG. 4, provided a camera 34 which has a taking lens 32, for example a macro-focusing lens, and a photographic film 33.

The size of the image I3 can be adjusted by moving the lens 8 along the optical axis for changing magnification. On the other hand, the attitude control of the image I3 can be effected by, for example, rotating the exit end of the image-transmitting fiber bundle 5 within 180° relative to the opposite end threof or an image rotation optical system well known to those skilled in the art.

It should be noted that scratch marks and dust on the surface of the field lens make an image quality that is inferior because the image is formed at the principal point of the field lens. Therefore, it is desirable to use a thick lens or a compounded lens as a field lens in order to provide images of good quality.

Although the above description has been directed to the front view type of holographic endoscopes to which is applied the present invention, the present invention is applicable to the side view type of holographic endoscopes and the rigid type of holographic endoscopes with the same results.

While there has been described what is considered to be a preferred embodiment of the invention, variations and modifications therein will occur to those skilled in the art once they become acquainted with the basic concepts of the invention. Therefore, it is intended that the appended claims should be construed to include not only the preferred embodiment, but all such variations and modifications as fall within the true spirit and scope of the invention.

What is claimed is:

1. In a holographic endoscope having a laser light source emitting a beam of light, means placed in the path of said beam for splitting said beam into an illuminating beam and a reference beam, a first optical system through which said illuminating beam passes for illuminating an object to be viewed and receiving and transmitting the image of that object toward a photographic medium, a second optical system for directing said reference beam toward said photographic medium, and means disposed in the path of said reference beam for interfering said reference beam and said transmitted image to produce an interference pattern to be recorded on said photographic medium; the improvement comprising a field lens disposed between said first optical system and said photographic medium in the path of said illuminating beam for increasing the intensity of the said transmitted image toward said photographic medium while allowing the distance between said first optical system and said photographic medium to be increased so as to accommodate the reference beam with which said transmitted image is made to interfere.

2. A holographic endoscope as defined in claim 1, and a lens located immediately beyond said first optical system in the path of said transmitted image for focusing said transmitted image onto said field lens.

3. A holographic endoscope as defined in claim 1, wherein said first optical system comprises a first flexible fiber-optic bundle for transmitting said illumianting beam toward said object and a second flexible fiber-optic bundle for transmitting said illuminating beam reflected from said object toward said field lens.

4. A holographic endoscope as defined in claim 3, wherein said first optical system comprises shutter means disposed between said first flexible fiber-optic bundle and said laser beam splitting means, said shutter means being adapted to open to allow said interference pattern to be recorded on said photographic medium and to close to allow an image of said object to be reproduced by illuminating said photographic medium with said reference beam after development of said photographic medium.

* * * * *